(12) United States Patent
Liu et al.

(10) Patent No.: US 9,482,137 B2
(45) Date of Patent: Nov. 1, 2016

(54) METHOD AND ALGORITHM FOR DIAGNOSING AN NH3 SENSOR IN AN SCR SYSTEM USING MEASUREMENTS FROM TWO CHANNELS OF THE SENSOR

(71) Applicant: Cummins Inc., Columbus, IN (US)

(72) Inventors: Feng Liu, Greenwood, IN (US); Mert Geveci, Delmar, NY (US)

(73) Assignee: Cummins Inc., Columbus, IN (US)

( * ) Notice: Subject to any disclaimer, the term of this patent is extended or adjusted under 35 U.S.C. 154(b) by 691 days.

(21) Appl. No.: 13/692,026

(22) Filed: Dec. 3, 2012

(65) Prior Publication Data

US 2013/0139489 A1   Jun. 6, 2013

Related U.S. Application Data

(60) Provisional application No. 61/565,508, filed on Dec. 1, 2011.

(51) Int. Cl.
*F01N 11/00* (2006.01)
*G01M 15/10* (2006.01)
(Continued)

(52) U.S. Cl.
CPC ............ *F01N 11/007* (2013.01); *F01N 3/106* (2013.01); *F01N 3/2066* (2013.01); *F01N 11/00* (2013.01);
(Continued)

(58) Field of Classification Search
CPC ............ F01N 11/00; F01N 2560/021; F01N 2560/026; F01N 2560/14; F01N 2900/0416; F01N 2900/1402; F01N 2900/1616; F02D 41/222; F02D 41/1441
See application file for complete search history.

(56) References Cited

U.S. PATENT DOCUMENTS

| 5,864,773 A | 1/1999 | Barna et al. |
| 6,876,919 B2 | 4/2005 | James et al. |

(Continued)

FOREIGN PATENT DOCUMENTS

| EP | 1793224 | 6/2007 |
| JP | 2004212145 A * | 7/2004 |

OTHER PUBLICATIONS

Machine translation of JP 2004-212145 A, accessed on Feb. 1, 2016.*

*Primary Examiner* — Jonathan Matthias
(74) *Attorney, Agent, or Firm* — Taft Stettinius & Hollister LLP

(57) ABSTRACT

A system includes an internal combustion engine providing exhaust gases to an exhaust conduit, an aftertreatment system having an SCR catalyst component and disposed in the exhaust conduit. The system further includes a first $NH_3$ sensing element preferentially sensitive to $NH_3$ and a second $NH_3$ sensing element preferentially sensitive to $NO_2$ in the exhaust conduit. Both $NH_3$ sensing elements are positioned downstream of the SCR catalyst component. The system includes a controller having a test conditions module that determines whether an $NO_2$ concentration downstream of the SCR catalyst component is below a threshold value, an $NH_3$ diagnostic module that provides a detection comparison value in response to the $NO_2$ concentration, a first signal from the first $NH_3$ sensing element, and a second signal from the second $NH_3$ sensing element. The controller includes a sensor condition module that provides an $NH_3$ sensor condition value in response to the detection comparison value.

20 Claims, 3 Drawing Sheets

(51) Int. Cl.
*F01N 3/10* (2006.01)
*F01N 3/20* (2006.01)
*F02D 41/14* (2006.01)
*F02D 41/22* (2006.01)
*F01N 13/00* (2010.01)

(52) U.S. Cl.
CPC ......... *F01N 13/0093* (2014.06); *F02D 41/146* (2013.01); *F02D 41/1441* (2013.01); *F02D 41/222* (2013.01); *G01M 15/102* (2013.01); *F01N 2550/02* (2013.01); *F01N 2560/021* (2013.01); *F01N 2560/026* (2013.01); *F01N 2560/14* (2013.01); *F02D 2041/1468* (2013.01); *Y02T 10/24* (2013.01); *Y02T 10/40* (2013.01); *Y02T 10/47* (2013.01)

(56) References Cited

U.S. PATENT DOCUMENTS

| 7,568,000 | B2 | 7/2009 | Keyes et al. | |
| 2010/0032292 | A1* | 2/2010 | Wang | G01N 33/0054 204/431 |
| 2001/0107609 | | 5/2010 | Parmentier et al. | |
| 2012/0234077 | A1* | 9/2012 | Wang et al. | 73/23.31 |

* cited by examiner

METHOD AND ALGORITHM FOR DIAGNOSING AN NH3 SENSOR IN AN SCR SYSTEM USING MEASUREMENTS FROM TWO CHANNELS OF THE SENSOR

RELATED APPLICATIONS

The present application is related to, and claims the benefit of U.S. Provisional patent application No. 61/565,508 titled "METHOD AND ALGORITHM FOR DIAGNOSING AN $NH_3$ SENSOR IN AN SCR SYSTEM USING MEASUREMENTS FROM TWO CHANNELS OF THE SENSOR," and filed on Dec. 1, 2011, and which is incorporated herein by reference in the entirety for all purposes.

BACKGROUND

Engines that meet modern emissions regulations often utilize aftertreatment systems to meet those emissions requirements. Aftertreatment systems to reduce $NO_x$ emissions can include selective catalytic reduction (SCR) components, which reduce $NO_x$ emissions in the presence of a reductant. A common reductant is urea, or alternatively ammonia, both of which end up as ammonia in the SCR component.

$NO_x$ treatment of engine exhaust, especially in systems utilizing a reductant, is particularly challenging. The ratio of $NO_x$ present to the amount of reductant should be kept within a relatively narrow range. However, the output of the engine in many applications is subject to high variability.

Accordingly, some control systems have been implemented that utilize an ammonia sensor to detect the amount of ammonia present in the exhaust. Wherever a sensor or component is utilized that is a part of the emissions control for an application, it is desirable, and sometimes required, that a failure or degradation of the system or component be detected. Detecting failures or degradation of an ammonia sensor is particularly challenging, as other components in the system do not provide secondary detection of ammonia for comparison. Therefore, further technological developments are desirable in this area.

SUMMARY

One embodiment is a unique method to diagnose an $NH_3$ sensor. Other embodiments include unique methods, systems, and apparatus to determine if an $NH_3$ sensor is reliable or failed. This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
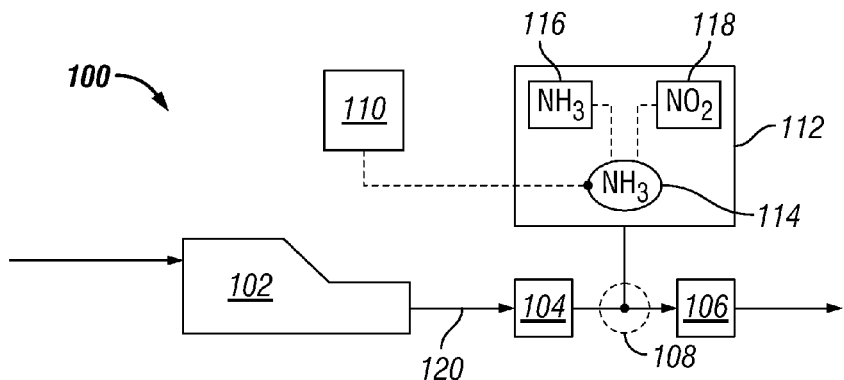
FIG. 1 is a schematic diagram of a system for diagnosing an $NH_3$ sensor.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, a system 100 includes an engine 102, and aftertreatment system having an SCR catalyst component 104, and an $NH_3$ sensor 112 operationally coupled to an exhaust stream 120 of the engine 102. Then engine 102 is any type of engine that produces $NO_x$ and has an SCR catalyst component 104 downstream to clean up the $NO_x$. An example system 100 includes the engine 102 in an application having a highly variable duty cycle, such as but not limited to a mobile application and/or a vehicle.

The example system 100 includes a second SCR catalyst component 106 downstream of the $NH_3$ sensor 114. The $NH_3$ sensor 114 includes a first sensing element 116 that is preferentially sensitive to $NH_3$, and a second sensing element 118 that is preferentially sensitive to $NO_2$. $NH_3$ sensors having a channel directed to $NH_3$ sensitivity and another channel directed to $NO_2$ sensitivity are known in the art. The sensing elements 116, 118 may be provided within a single housing 112 or may be provided separately.

An example system further includes an oxidation catalyst (not shown) operationally coupled to the exhaust stream 120 at a position upstream of the SCR catalyst components 104, 106 and $NH_3$ sensor 114. The oxidation catalyst may be present to reduce emissions in the exhaust stream 120, for example unburned hydrocarbons or particulate matter, and/or to support operations of the SCR catalyst component 104, 106. For example, the SCR catalyst component 104, 106 may operate most efficiently at an optimal $NO:NO_2$ ratio, typically 1:1, and the engine 102 may produce $NO_x$ having less $NO_2$ than the optimal $NO:NO_2$ ratio provides. The oxidation catalyst, when present, at a proper operating temperature, and having sufficient oxygen available, partially oxidizes some of the NO to $NO_2$, moving the $NO:NO_2$ ratio toward the optimal ratio. The optimal $NO:NO_2$ ratio depends upon the catalyst formulation of the SCR catalyst components 104, 106 and upon the $NO_x$ conversion designed into the system at the SCR catalyst component 104, 106 to meet emissions targets.

The amount of conversion of NO to $NO_2$ in the oxidation catalyst can be known based upon the incident NO and $NO_2$ amounts and the current operating temperature of the catalyst. Generally sufficient oxygen is present for the NO to $NO_2$ reaction to proceed, however the oxygen level can be tracked, and the reaction may be determined to have stopped during periods of rich or very low oxygen. Further, the engine out NO and $NO_2$ generation profile can be understood at various operating conditions, providing an estimate of the NO and $NO_2$ in to the oxidation catalyst. Accordingly, an overall estimate of the present amount of NO, $NO_2$, and $NO_x$ into the oxidation catalyst and then available at the $NH_3$ sensor 114 is available with the type data mapping for a given engine that is ordinarily available to one of skill in the art.

In certain embodiments, the system 100 further includes a controller 110 structured to perform certain operations to diagnose the $NH_3$ sensor 114. In certain embodiments, the controller 110 includes one or more modules structured to functionally execute the operations of the controller 110. In certain embodiments, the controller 110 forms a portion of a processing subsystem including one or more computing devices having memory, processing, and communication hardware. The controller 110 may be a single device or a distributed device, and the functions of the controller 110 may be performed by hardware or software.

An example controller 110 includes a test conditions module that determines whether an $NO_2$ concentration is below a threshold value. The $NO_2$ concentration that is below the threshold value is dependent upon the purpose of the diagnostic operations for the $NH_3$ sensor 114. Additionally or alternatively, the threshold value is also dependent upon the fidelity of engine-out NO and $NO_2$ generation models, and of the NO to $NO_2$ conversion model in the oxidation catalyst. The purpose of the diagnostic determines how much "noise" can be introduced by the amount of $NO_2$ in the exhaust stream during the diagnostic of the $NH_3$ sensor 114. If the $NH_3$ amount from the $NH_3$ sensor 114 is utilized in a finely tuned control operation for the SCR catalyst components 104, 106, a higher resolution diagnostic and thus lower $NO_2$ threshold may be required. If the diagnostic is utilized for a gross sensor rationality check, then amount of $NO_2$ remaining in the system during the diagnostic may be significant and the purposes of the diagnostic may still be achieved. Similarly, if the NO and $NO_2$ models of the engine are robust, and the NO to $NO_2$ generation model of the oxidation catalyst (where present) is likewise very accurate, then the effects of $NO_2$ in the exhaust on the diagnostic are more easily compensated and the threshold amount can be relatively high.

In certain embodiments, the engine produces very little $NO_2$, and/or the diagnostic is operated when the oxidation catalyst is at a temperature to be ineffective in converting NO to $NO_2$. Accordingly, in certain embodiments, the $NO_2$ amount and threshold $NO_2$ amount to enable the diagnostic are ignored. Additionally or alternatively, the diagnostic may be performed when the $NO_x$ amount out of the engine is very low, such that the amount of $NO_x$ that is present as $NO_2$ or converted to $NO_2$ is negligible even at full conversion to $NO_2$, and the threshold amount may be ignored.

An example controller 110 further includes an $NH_3$ diagnostic module that provides a detection comparison value in response to the $NO_2$ concentration being below the threshold value, and further in response to a first signal from the first $NH_3$ sensing element and a second signal from the second $NH_3$ sensing element. to the first signal from the first $NH_3$ sensing element an , and a sensor condition module. An example controller 110 further includes the sensor condition module providing an $NH_3$ sensor condition value in response to the detection comparison value.

The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2.

Certain operations herein are described as interpreting one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 2:
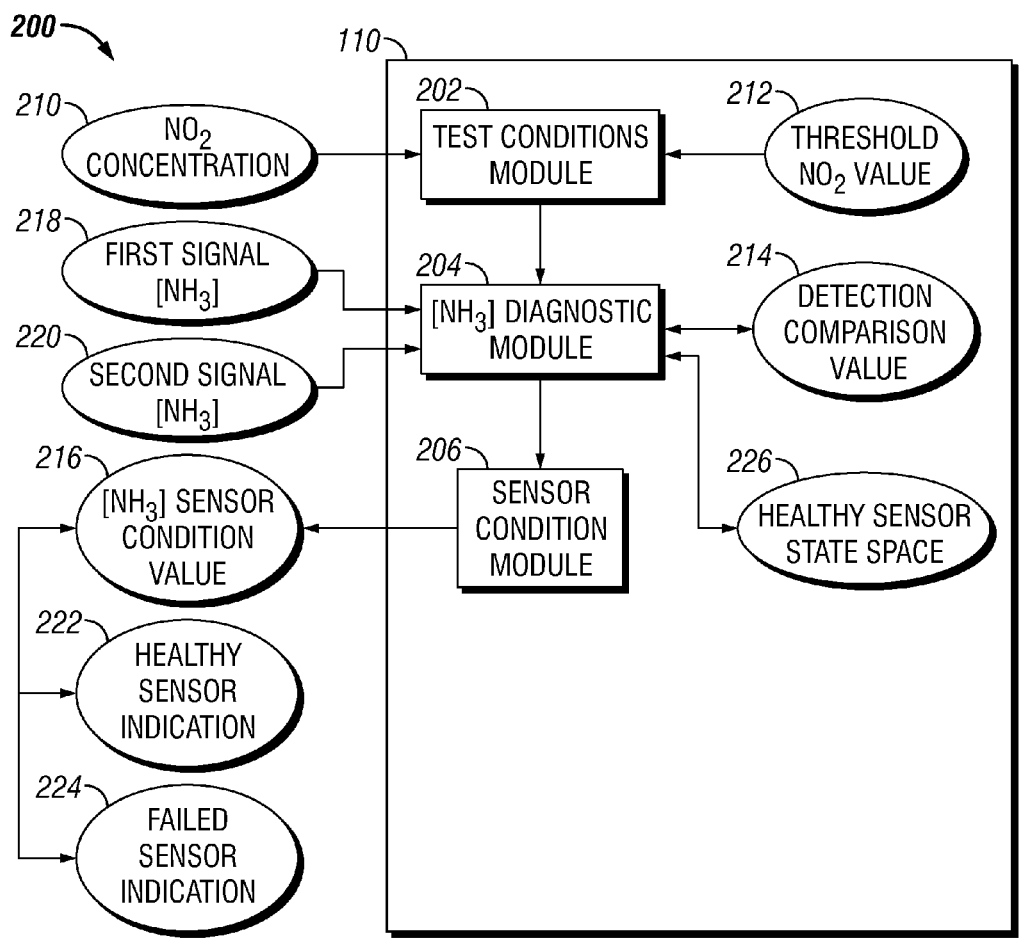
FIG. 2 is a schematic diagram of a processing subsystem having a controller, the controller structured to functionally execute operations for diagnosing an $NH_3$ sensor.

FIG. 2 is a schematic illustration of a processing subsystem 200 including a controller 110. The example controller 110 includes a test conditions module 202 that determines whether an $NO_2$ concentation 210 at the position (e.g. position 108 in FIG. 1) downstream of the SCR catalyst component is below a threshold $NO_2$ value 210. The $NO_2$ concentration 212 at the position 108 is reduced by the "fast SCR reaction" on the upstream SCR catalyst component:

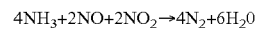

$$4NH_3+2NO+2NO_2 \rightarrow 4N_2+6H_2O$$

An example test conditions module 202 determines that engine out $NO_x$ is very low (indicating that the $NO_2$ concentration will likewise be low), and/or that the SCR catalyst component conditions are favorable for the fast SCR reaction to be properly reacting the majority of the $NO_2$, thereby providing an indication that the $NO_2$ concentration 210 is below the threshold $NO_2$ value 212. Additionally or alternatively, the test conditions module 202 is provided with a calibrated set of engine operating conditions and/or SCR catalyst component operating temperatures over which the $NO_2$ concentration 210 will be estimated to be lower than the threshold $NO_2$ value 212. In certain embodiments, the test conditions module 202 is not present, and/or the test conditions module 202 estimates the $NO_2$ concentration 210 to be lower than the threshold $NO_2$ value 212 at all operating conditions.

The example controller 110 further includes an $NH_3$ diagnostic module 204 that provides a detection comparison value 214 in response to the $NO_2$ concentration 210 being below the threshold $NO_2$ value 212. Where the test conditions module 202 is not present, an example $NH_3$ diagnostic module 204 provides a detection comparison value 214 whenever a test of the $NH_3$ sensor 114 is to be performed, for example once per vehicle trip, once per set time period, once per operating time or distance value, etc.

In certain embodiments, the $NH_3$ diagnostic module 204 provides the detection comparison value 214 in response to a difference between an $NH_3$ value from a first signal 218 provided by the sensing element 116 and a second signal 220 provided by the sensing element 118. The difference between the $NH_3$ value from a first signal 218 provided by the sensing element 116 and a second signal 220 provided by the sensing element 118 may be an absolute difference, a relative difference, a ratio between the signals 218, 220, and/or a function of one of the differences or ratio. Where the detection comparison value 214 is indicative of a large enough difference, the sensor 114 is deemed to be failed, suspect, failing, and/or incremented in a negatively operating manner. For example, measurements of the detection comparison value 214 exceeding a threshold may increment or progress toward a failed indication, while measurements of the detection comparison value 214 below the threshold may decrement or progress toward a passed indication.

An example $NH_3$ diagnostic module 204 further interprets a healthy sensor state space 226, and provides the detection comparison value 214 in response to a comparison of the healthy sensor state space 226 with the first and second signals 218, 220. Referencing FIG. 4, an example calibration 400 of the healthy sensor state space 226 is illustrated. The healthy sensor state space 226 includes a region where the first signal 218 and second signal 220 are acceptably close together. In the example, data from a failed and operational sensor may be utilized to calibrate the healthy sensor state space 226. In the example calibration 400, a first failed region 404 and a second failed region 406 are presented, where a reading of the first signal 218 and second signal 220 that falls within either of the failed regions 404, 406 incurs a determination of a failed sensor, or an increment and/or progression toward a determination of a failed sensor.

Figure 4:
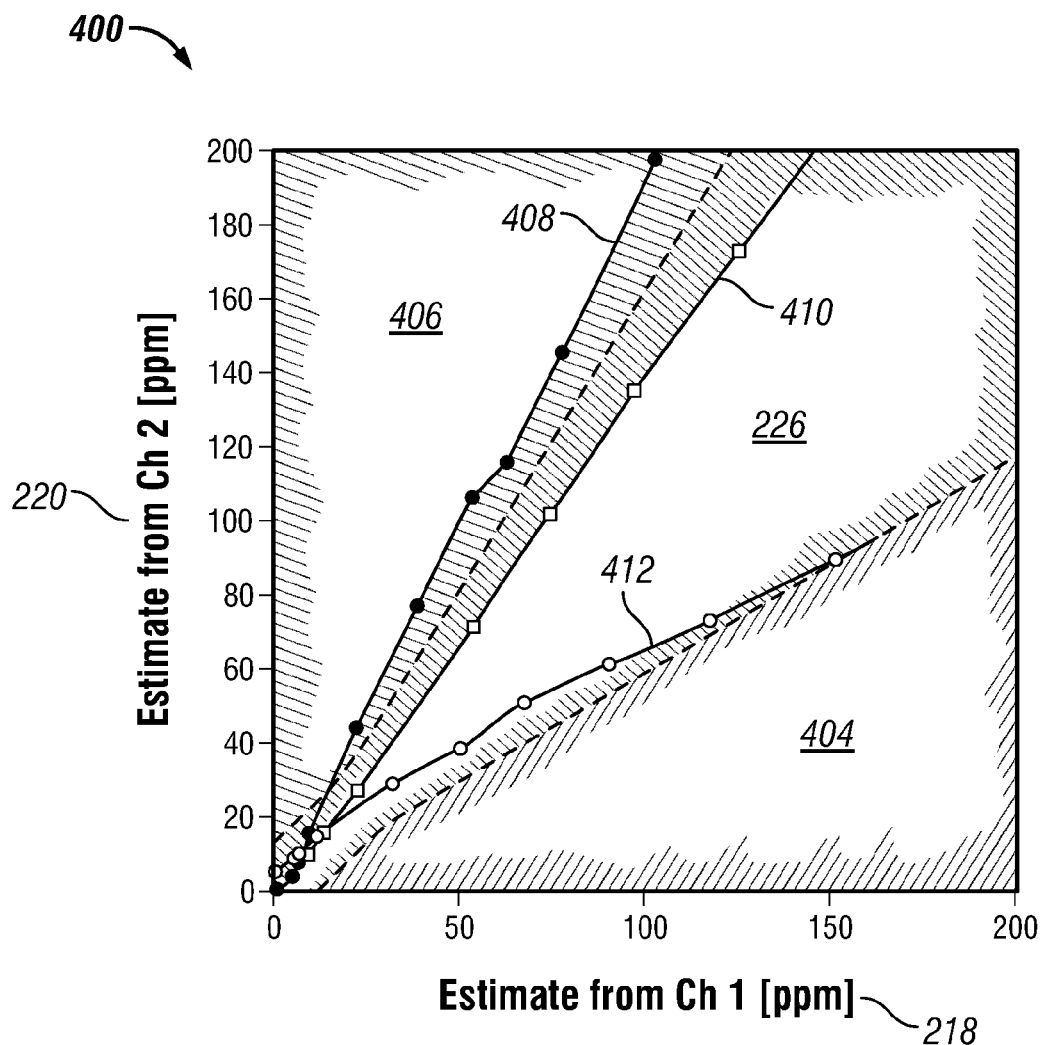
FIG. 4 depicts illustrative data for a first and second $NH_3$ element response to an $NH_3$ amount.

In the example of FIG. 4, the outer series of points just inside the second failed region 406 are from a single sensor setup and, in the example of FIG. 4, would be a series of data points that indicate a determination of, or progression towards, a failed sensor; these points are connected by the line 408 for illustrative purposes to clarify the grouping. The series of points just inside the healthy sensor state space 226 near the second failed region 406 are from a single sensor setup and, in the example of FIG. 4, would be a series of data points that indicate a determination of, or progression towards, a passed sensor; these points are connected by the line 410 for illustrative purposes to clarify the grouping. The series of points along the bottom of the healthy sensor state space 226 near the first failed region 404 are from a single sensor setup and, in the example of FIG. 4, are preliminarily a series of data points that indicate a determination of, or progression towards, a passed sensor; these points are connected by the line 412 for illustrative purposes to clarify the grouping. Because the slope of the line 412 is such that the line may cross into the first failed region 404 at higher $NH_3$ readings that were run in the experiment, in certain embodiments, the slope of the readings may be utilized to determine the health of the sensor. In certain embodiments, where the points remain in the healthy sensor state space 226 throughout the range of $NH_3$ values of interest, the a sensor exhibiting the characteristics on the line 412 may be determined to be healthy.

Figure 3:
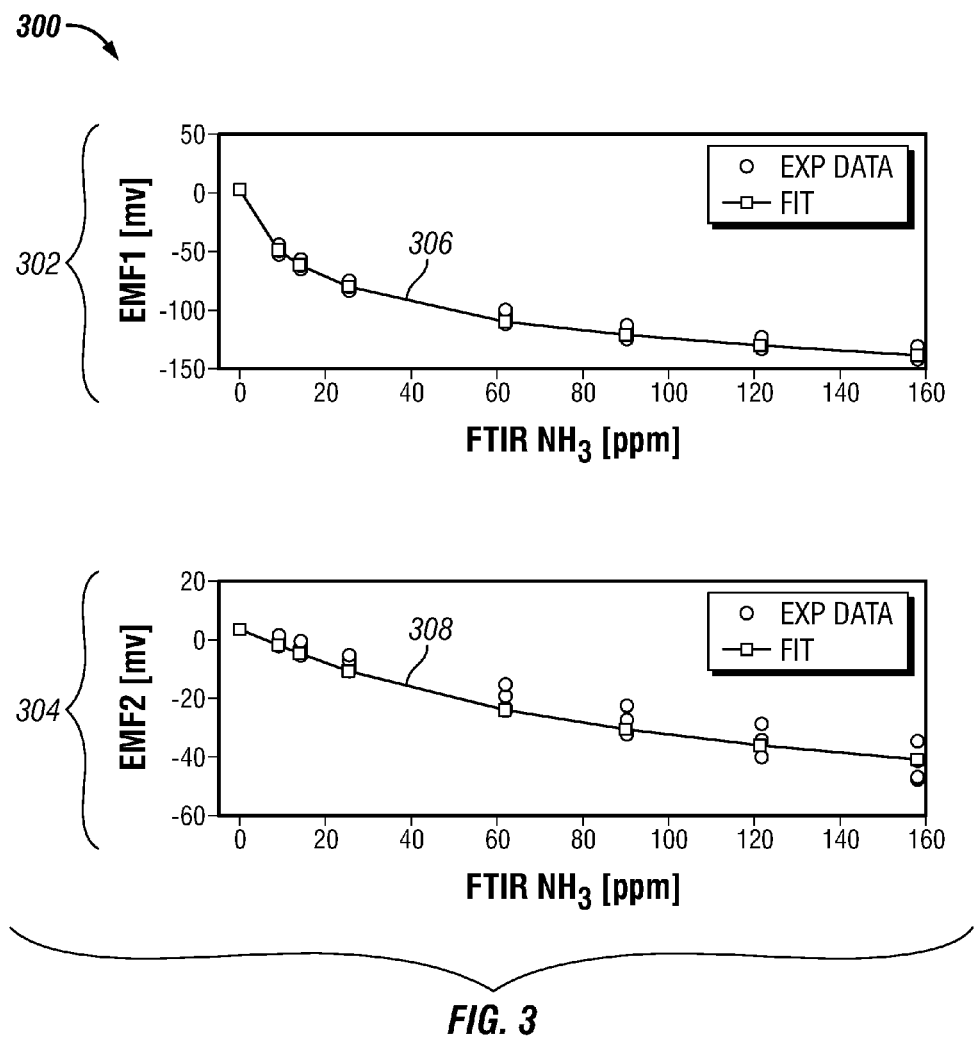
FIG. 3 depicts illustrative data for a first and second $NH_3$ element response to an $NH_3$ amount.

Referencing FIG. 3, experimental data 300 from an example sensor is illustrated. A first data set 302 includes first signal 218 data for a sensing channel that is tuned to be sensitive to $NH_3$. The curve 306 is a fitted line through the experimental data points. A second data set 304 includes second signal 220 data for a sensing channel that is tuned to be sensitive to $NO_2$. The curve 308 is a fitted line through the experimental data points. It is seen that, for a nominally operating sensor, the curves 306, 308 move in a similar relationship—an exponentially decaying relationship in the example. Accordingly, a ratio between the two signals 218, 220 remains relatively fixed between the channels as the $NH_3$ amount increases. FIG. 4 depicts one selected boundary for such a relationship between the two signals 218, 220.

An example controller 110 includes a sensor condition module 206 that provides an $NH_3$ sensor condition value 216 in response to the detection comparison value 214. In certain embodiments, the sensor condition module 206 provides a healthy sensor indication 222 when the detection comparison value 214 indicates the first signal 218 and the second signal 220 are close. In certain embodiments, the sensor condition module 206 provides a failed sensor indication 224 when the detection comparison value 214 indicates the first signal 218 and the second signal 220 are too far apart. In certain embodiments, the difference the first signal 218 and the second signal 220 that provides a healthy or failed sensor indication is determined according to data such as that illustrated in FIGS. 3 and 4. In certain embodiments, the $NH_3$ sensor condition value 216 indicates a passed, healthy, failed, suspect, or other health indication value. In certain embodiments, the $NH_3$ sensor condition value 216 provides an indicator whether the $NH_3$ sensor 114 should be deemed to increment or progress toward a passed, healthy, failed, suspect, or other health indication value.

The schematic flow descriptions which follow provides illustrative embodiments of performing procedures for determining whether an $NH_3$ sensor is operating properly. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

An example procedure includes an operation to determine that a test condition is met. The test condition includes a determination that a sensor check is indicated and/or a determination that an $NO_2$ amount present and detected by the sensor is at an acceptably low value. An example determination that the $NO_2$ amount present is at the acceptably low value includes determining that an engine operating condition is within a prescribed range of operating conditions, and/or that an upstream SCR catalyst is at a proper operating temperature for converting $NO_2$ in the fast SCR reaction.

The example procedure further includes interpreting a first signal from a first channel that is structured to be sensitive to $NH_3$ amounts, and a second signal from a second channel that is structured to be sensitive to $NO_2$ amounts. The example procedure further includes determining whether a difference between the first signal and the second signal is acceptably close to an expected value, including whether the signals are within a specified range of signal ratios. A further example procedure includes an operation to determine that the first signal and second signal exist within a predetermined healthy state space region. The procedure further includes an operation to provide an $NH_3$ sensor condition value in response to the determination of the difference between the first signal and the second signal.

Yet another example procedure is described. The example procedure includes testing a representative sensor for an application, the sensor being an $NH_3$ sensor having a first detection channel sensitive to $NH_3$ and a second detection channel sensitive to $NO_2$. In certain embodiments, the procedure includes providing a description representative of a healthy sensor state space, including a lookup table, equations, or other descriptions stored and accessible during sensor health checking operations. The procedure includes operating an internal combustion engine producing exhaust gases having $NO_x$ as a byproduct of operation. The procedure includes sampling the exhaust gas with an $NH_3$ sensor at a position downstream of an SCR catalyst component, and determining a detected value on a first channel of the sensor sensitive to $NH_3$, and on a second channel of the sensor sensitive to $NO_2$. The procedure includes an operation to compare the first detected value from the first channel and the second detected value from the second channel with the description representative of a healthy sensor state space. The procedure further includes an operation to provide an $NH_3$ sensor condition value in response to the comparing.

As is evident from the figures and text presented above, a variety of embodiments according to the present disclosure are contemplated.

An example set of embodiments is a system including an internal combustion engine providing exhaust gases to an exhaust conduit, an aftertreatment system disposed in the exhaust conduit, the aftertreatment system comprising an SCR catalyst component, a first $NH_3$ sensing element operationally coupled to the exhaust conduit at a position downstream of the SCR catalyst component, the first $NH_3$ sensing element preferentially sensitive to $NH_3$, and a second $NH_3$ sensing element operationally coupled to the exhaust conduit at the position downstream of the SCR catalyst component, the second $NH_3$ sensing element preferentially sensitive to $NO_2$. The example system further includes a controller having a number of modules that functionally execute operations to diagnose an $NH_3$ sensor. The example controller includes a test conditions module, an $NH_3$ diagnostic module, and a sensor condition module.

An example test conditions module determines whether an $NO_2$ concentration at the position downstream of the SCR catalyst component is below a threshold value. An example $NH_3$ diagnostic module provides a detection comparison value in response to the $NO_2$ concentration being below the threshold value and further in response to a first signal from the first $NH_3$ sensing element and a second signal from the second $NH_3$ sensing element. An example sensor condition module provides an $NH_3$ sensor condition value in response to the detection comparison value.

The example system may include one or more of the following additional or alternative features. An example system includes the first $NH_3$ sensing element and the second $NH_3$ sensing element are disposed in a single sensor housing, and/or the first $NH_3$ sensing element and the second $NH_3$ sensing element each having a differential response to $NO_2$. In certain embodiments, the $NH_3$ diagnostic module is further provides the detection comparison value in response to a difference between an $NH_3$ value from the first signal and an $NH_3$ value from the second signal, further provides the detection comparison value in response to an $NH_3$ value from the first signal and an $NH_3$ value from the second signal, and/or further interprets a healthy sensor state space, and provides the detection comparison value in response to a comparison of the healthy sensor state space with a position determined from the $NH_3$ value from the first signal and the $NH_3$ value from the second signal.

An example system includes the $NH_3$ diagnostic module further interpreting a healthy sensor state space, and providing the detection comparison value in response to a comparison of the healthy sensor state space with a position determined from an $NH_3$ value from the first signal and an $NH_3$ value from the second signal. In a further example, the position within the healthy sensor state space is determined to be a healthy sensor indication, and a position outside the healthy sensor state space is determined to be a failed sensor indication. In certain embodiments, the system includes the first $NH_3$ sensing element being an $NH_3$ detection element of an $NH_3$ sensor, and the second $NH_3$ sensing element being an $NO_2$ compensation element of the $NH_3$ sensor.

An example method includes interpreting a first signal from a first $NH_3$ sensing element and a second signal from a second $NH_3$ sensing element, wherein the first and second $NH_3$ sensing elements comprise distinct sensitivities to $NO_2$, providing a detection comparison value in response to the first signal and the second signal, and providing an $NH_3$ sensor condition value in response to the detection comparison value. Additional operations of the method present in certain embodiments are described following.

A method includes the detection comparison value being a difference between the first signal and the second signal, where the providing an $NH_3$ sensor condition value in response to the detection comparison value includes determining if the difference exceeds a sensor failed threshold value. An example method includes determining that an amount of $NO_2$ present is below a sensor check threshold value, and/or where determining the amount of $NO_2$ present is below the sensor check threshold value includes: determining that an engine out $NO_x$ amount is below a predetermined amount, determining that an engine is operating at a low $NO_x$ output operating condition, determining that an oxidation catalyst is at a low $NO$-$NO_2$ conversion condition, determining that an oxidation catalyst is below a predetermined temperature, and/or and determining that an amount of oxygen available in the engine exhaust is below a predetermined level.

In certain embodiments the method includes interpreting a first signal-second signal sensor operation map, where providing the detection comparison value in response to the first signal and the second signal includes returning a sensor operating region in response to the first signal, the second signal, and the map. In certain further embodiments, the method includes providing the $NH_3$ sensor condition value as one of a healthy sensor indication and a failed sensor indication in response to the detection comparison value.

Another example set of embodiments is an apparatus including a test conditions module that interprets a first signal from a first $NH_3$ sensing element and a second signal from a second $NH_3$ sensing element, where the first and second $NH_3$ sensing elements are operationally coupled to an engine exhaust at a position downstream of a selective catalytic reduction (SCR) catalyst component. The apparatus further includes an $NH_3$ diagnostic module that provides a detection comparison value in response to the first signal and the second signal, and a a sensor condition module that provides an $NH_3$ sensor condition value in response to the detection comparison value. In certain additional or alternative embodiments, the test conditions module further determines whether an $NO_2$ concentration at the position downstream of the SCR catalyst component is below a threshold value, and the $NH_3$ diagnostic module further provides the detection comparison value in response to the $NO_2$ concentration being below the threshold value. In certain embodiments, the $NH_3$ diagnostic module further provides the detection comparison value in response to a difference between the first signal and the second signal, and/or provides the detection comparison value in response to a magnitude of each of the first signal and the second signal. Additionally or alternatively, the first $NH_3$ sensing element and the second $NH_3$ sensing element are disposed in a single sensor housing. In still further embodiments, the first $NH_3$ sensing element and the second $NH_3$ sensing element include a differential response to $NO_2$, and/or the first $NH_3$ sensing element is an $NH_3$ detection element of an $NH_3$ sensor, and the second $NH_3$ sensing element is an $NO_2$ compensation element of the $NH_3$ sensor.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   an internal combustion engine providing exhaust gases to an exhaust conduit;
   an aftertreatment system disposed in the exhaust conduit, the aftertreatment system comprising a selective catalytic reduction (SCR) catalyst component;
   a first $NH_3$ sensing channel operationally coupled to the exhaust conduit at a position downstream of the SCR catalyst component, the first $NH_3$ sensing channel sensitive to $NH_3$;
   a second $NH_3$ sensing channel operationally coupled to the exhaust conduit at the position downstream of the SCR catalyst component, the second $NH_3$ sensing channel more sensitive to $NO_2$ than the first $NH_3$ sensing channel, and the first $NH_3$ sensing channel is more sensitive to $NH_3$ than the second $NH_3$ sensing channel; and
   a electronic controller operationally coupled to and configured to interpret a first signal from the first $NH_3$ sensing channel and a second signal from the second $NH_3$ sensing channel, wherein the first and second $NH_3$ sensing channels are operationally coupled at a position downstream of the SCR catalyst component, the controller being configured to determine whether an $NO_2$ concentration at the position downstream of the SCR catalyst component is below a threshold value, the controller being configured to not enable an $NH_3$ sensor condition diagnostic in response to the $NO_2$ concentration being above the threshold value and to enable the $NH_3$ sensor condition diagnostic to provide a detection comparison value in response to the $NO_2$ concentration being below the threshold value, and further in response to a first signal from the first $NH_3$ sensing channel and a second signal from the second $NH_3$ sensing channel, the controller further being configured to provide an $NH_3$ sensor condition value in response to the detection comparison value.

2. The system of claim 1, wherein the first $NH_3$ sensing channel and the second $NH_3$ sensing channel are disposed in a single sensor housing.

3. The system of claim 2, wherein the first $NH_3$ sensing channel and the second $NH_3$ sensing channel comprise a differential response to $NO_2$.

4. The system of claim 1, wherein the controller is further configured to provide the detection comparison value in response to a difference between an $NH_3$ value from the first signal and an $NH_3$ value from the second signal.

5. The system of claim 1, wherein the controller is further configured to provide the detection comparison value in response to an $NH_3$ value from the first signal and an $NH_3$ value from the second signal.

6. The system of claim 5, wherein the controller is further configured to interpret a healthy sensor state space, and to provide the detection comparison value in response to a comparison of the healthy sensor state space with a position determined from the $NH_3$ value from the first signal and the $NH_3$ value from the second signal.

7. The system of claim 1, wherein the controller is further configured to interpret a healthy sensor state space, and to provide the detection comparison value in response to a comparison of the healthy sensor state space with a position determined from an $NH_3$ value from the first signal and an $NH_3$ value from the second signal.

8. The system of claim 7, wherein a position within the healthy sensor state space is determined to be a healthy sensor indication, and wherein a position outside the healthy sensor state space is determined to be a failed sensor indication.

9. The system of claim 1, wherein the first $NH_3$ sensing channel comprises an $NH_3$ detection element of an $NH_3$ sensor, and wherein the second $NH_3$ sensing channel comprises an $NO_2$ compensation element of the $NH_3$ sensor.

10. A method, comprising:
    performing, with an electronic controller operationally coupled to and configured to interpret a first signal from a first $NH_3$ sensing channel and a second signal from a second $NH_3$ sensing channel that are operationally coupled to an exhaust gas conduit downstream of a selective catalytic reduction (SCR) component, the following:
    determining whether an amount of $NO_2$ present in an exhaust gas produced by operation of an internal combustion engine connected to the exhaust gas conduit is below a sensor check threshold value;
    in response to the amount of $NO_2$ present being above the sensor check threshold value, not enabling an $NH_3$ sensor condition diagnostic;
    in response to the amount of $NO_2$ present being below the sensor check threshold value, interpreting the first signal from the first $NH_3$ sensing channel and the second signal from the second $NH_3$ sensing channel, wherein the first and second $NH_3$ sensing channels comprise distinct sensitivities to $NO_2$;
    providing a detection comparison value in response to the first signal and the second signal; and
    providing an $NH_3$ sensor condition value in response to the detection comparison value.

11. The method of claim 10, wherein the detection comparison value comprises a difference between the first signal and the second signal, and wherein the providing an $NH_3$ sensor condition value in response to the detection comparison value comprises determining if the difference exceeds a sensor failed threshold value.

12. The method of claim 10, wherein the determining the amount of $NO_2$ present is below the sensor check threshold value comprises at least one operation selected from the operations consisting of:
    determining that an engine out $NO_x$ amount is below a predetermined amount;
    determining that an engine is operating at a low $NO_x$ output operating condition;
    determining that an oxidation catalyst is at a low $NONO_2$ conversion condition;
    determining that an oxidation catalyst is below a predetermined temperature; and
    determining that an amount of oxygen available in the engine exhaust is below a predetermined level.

13. The method of claim 10, further comprising interpreting a first signal-second signal sensor operation map, and wherein the providing the detection comparison value in response to the first signal and the second signal comprises returning a sensor operating region in response to the first signal, the second signal, and the map.

14. The method of claim 13, further comprising providing the $NH_3$ sensor condition value as one of a healthy sensor indication and a failed sensor indication in response to the detection comparison value.

15. An apparatus, comprising:
an electronic controller operationally coupled to and configured to interpret a first signal from a first $NH_3$ sensing channel and a second signal from a second $NH_3$ sensing channel, wherein the first and second $NH_3$ sensing channels are operationally coupled to an engine exhaust at a position downstream of a selective catalytic reduction (SCR) component;
the electronic controller further being configured to determine whether an $NO_2$ concentration at the position downstream of the SCR component is below a threshold value, the electronic controller further being configured to not enable an $NH_3$ sensor condition diagnostic in response to the $NO_2$ concentration being above the threshold value and to enable the $NH_3$ sensor condition diagnostic to provide a detection comparison value based on the first signal and the second signal in response to the $NO_2$ concentration being below the threshold value, the electronic controller further being configured to provide an $NH_3$ sensor condition value in response to the detection comparison value.

16. The apparatus of claim 15, wherein the electronic controller is further configured to provide the detection comparison value in response to a difference between the first signal and the second signal.

17. The apparatus of claim 16, wherein the electronic controller is further configured to provide the detection comparison value in response to a magnitude of each of the first signal and the second signal.

18. The apparatus of claim 17, wherein the first $NH_3$ sensing channel and the second $NH_3$ sensing channel are disposed in a single sensor housing.

19. The apparatus of claim 18, wherein the first $NH_3$ sensing channel and the second $NH_3$ sensing channel comprise a differential response to $NO_2$.

20. The apparatus of claim 19, wherein the first $NH_3$ sensing channel comprises an $NH_3$ detection element of an $NH_3$ sensor, and wherein the second $NH_3$ sensing channel comprises an $NO_2$ compensation element of the $NH_3$ sensor.

* * * * *